Sept. 28, 1954  J. MANTELET  2,690,307
DETACHABLE CAPSULE FOR BOTTLES AND CONTAINERS
Filed Sept. 25, 1951  2 Sheets-Sheet 1

INVENTOR
Jean Mantelet
BY

Sept. 28, 1954  J. MANTELET  2,690,307
DETACHABLE CAPSULE FOR BOTTLES AND CONTAINERS
Filed Sept. 25, 1951  2 Sheets-Sheet 2

INVENTOR
Jean Mantelet
BY

Patented Sept. 28, 1954

2,690,307

UNITED STATES PATENT OFFICE 2,690,307

DETACHABLE CAPSULE FOR BOTTLES AND CONTAINERS

Jean Mantelet, Bagnolet, France, assignor to "Le Moulin-Legumes" Manufacture d'Emboutissage de Bagnolet (M. E. B.) Anciens Etablissements Mantelet et Boucher (Societe Anonyme), Bagnolet, France, a corporation of France Application September 25, 1951, Serial No. 248,180

Claims priority, application France October 4, 1950

10 Claims. (Cl. 241—168)

This invention relates to a detachable capsule for bottles, wide-mouthed jars and, as a rule, any containers formed with an outer bead adjacent to their mouths or aperture. The invention is concerned more particularly with the capsuling of small mills for salt, pepper and other spices by means of a removable grid member adapted to cooperate with a grinding member carried by the container or bottle and consisting more particularly of helical inclined planes formed on the top edge of the neck of the bottle or container.

The detachable capsule according to the invention comprises a cap member or capsule the height of which is such as to cover the mouth of the container without completely enclosing the bead thereof, at least one strap member pivotally mounted on the cap member proper and adapted by pivoting about an axis parallel with the top of the cap member either to locate itself beneath the bead so as to act as a capsule retaining member having a bearing sufficient to prevent any undesired or untimely removal of the capsule, or to be moved away from this bead for releasing the capsule. Moreover, this strap member is formed at its free end with a locking means adapted in its retaining position to engage a cooperating locking means carried by the capsule.

It is one object of this invention to provide a detachable spice-mill capsule for a bottle or container, wherein a sufficient clearance is left between the mouth of the bottle or container and the milling member for permitting the relative angular displacement required for the operation of the device.

Another object of the present invention is to provide a detachable capsule as broadly defined in the preceding paragraph for a bottle or container, wherein a washer of suitable material is inserted in the aforesaid clearance so as to form a sealed stopping.

A further object of the invention is to provide a detachable capsule for a bottle or container wherein that portion of the capsule periphery which engages the top edge of the bottle or container is so perforated as to form a grid, whereas this top edge is formed with inclined planes acting as milling means.

It is another object of this invention to provide a detachable capsule of the above-defined type wherein the strap member is formed at one end with a cylindrical portion adapted to be journaled in a bearing formed in or carried by the capsule and parallel to the axis thereof, this cylindrical portion forming the extension of a curved portion corresponding in shape to the neck of the container to which it is to be fitted, the opposite end of the strap member having a locking member adapted to cooperate with a registering member carried by the capsule.

In addition, it is one object of this invention to provide a detachable capsule carrying a single strap member extending along more than one-half of the periphery of the neck of the bottle or container.

Another object of the invention is to provide a detachable capsule carrying a pair of symmetrical strap members extending along less than one-half of the periphery of the neck of the bottle or container and pivotally mounted adjacent each other.

Another object of the invention is to provide a detachable capsule having a pair of symmetrical identical strap members extending along less than one-half of the periphery of the neck of the bottle or container and pivotally mounted at diametrally opposed points.

Another object of this invention is to provide a detachable capsule carrying a pair of suitably bent strap members having a certain resiliency, a lateral portion of the capsule engaged by a rectilinear portion of the free end of each strap member being formed with a cavity adapted to receive this rectilinear portion and preceded by a cam face in view of locking the strap member in its retaining position.

Another object of this invention is to provide a detachable capsule consisting of a metal cap member, a hoop ring preferably of plastic material which fits the periphery of the cap member and forming with the lateral wall thereof recesses adapted to receive the pivoting portions of the strap members the free ends of which are bent at right angles to the capsule's axis.

The invention is also concerned with the provision of a detachable capsule of the above-defined type wherein the strap members consist of half-collars hingedly mounted on a common pivot pin fixed in a projection formed on the cap member, means being provided for locking the free ends of these collars in their retaining positions.

Other features and advantages of the invention will appear in the following description of a few possible embodiments of the invention which are given solely for illustrative purpose with reference to the attached diagrammatical drawings. In the drawings.

Figure 4:
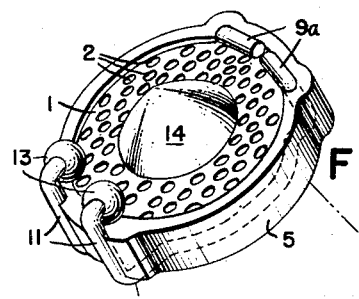
Figs. 3 and 4 are a plane view and a perspective view respectively of the capsule with the strap members in their retaining positions.

Referring now to the drawings and more particularly to the embodiment of the invention illustrated in Figs. 1–11, the detachable spice-mill capsule according to the invention may comprise a pressed capsule or cap member 1 (Figs. 6, 7) preferably of a metal unacted upon by bay-salt, formed with a peripheral annulus of perforations 2, a central concavity 3 and an axial hole 4.

Figure 1:
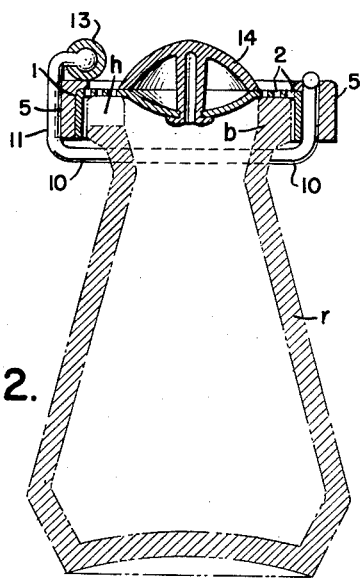
Fig. 1 is an axial section of a capsule according to the invention fitted on a salt-mill.
Figure 2:
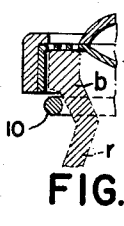
Fig. 2 is a fragmentary axial section of the same assembly but through a different diameter.

This cap member 1 is adapted to be covered with a ring member 5 (Figs. 9, 10) preferably of plastic material, as shown in Fig. 1, formed with a pair of inner cavities 6, a pair of outer cavities 7 diametrally opposed to, and at a greater radius than, the inner cavities 6, a cam face 8 being formed on either side of the outer cavities as shown.

A pair of symmetrical hooks 10 preferably of resilient metal such as stainless steel wire are fitted through their suitably shaped pivot ends 9 in the inner cavities 6 of the ring member 5 and retained for pivotal movement therein by tip portions 9a bent at right angles to the pivot ends 9. The central portions of these symmetrical hooks 10 are curved with a radius shorter than the outer radius of the bead b of the container or bottle r (see Fig. 1) to which the capsule is to be fitted. The hook ends opposite to the aforesaid pivot ends 9 are substantially similar to the latter except that they terminate with tip portions 12 parallel to the axis of symmetry of the pair of hooks 10. Ball-shaped elements 13 are formed integrally with or fixed to these tip portions 12 as shown. For instance, these ball-shaped elements may be formed of plastic material by merely inserting the previously flattened tips 12 into a mold, according to the known technique.

This capsule may be embellished by introducing the shank portion of a mushroom-shaped member 14 of any suitable material into the aforesaid central hole 4 and subsequently setting the parts together as illustrated in Fig. 1.

Figure 5:
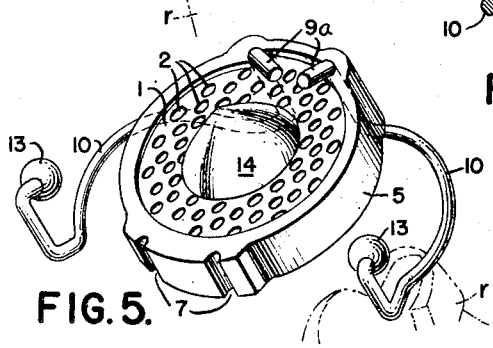
Fig. 5 is a perspective view of the same device but with the strap members in their open positions.
Figure 3:
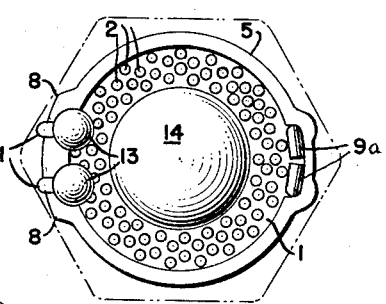
Figure 8:
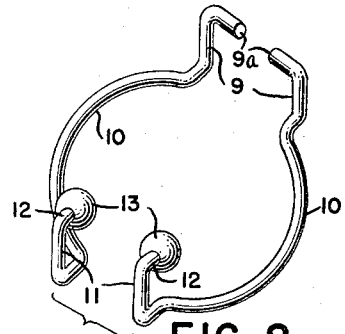
Fig. 8 is a perspective view of both strap members in their retaining positions.
Figure 6:
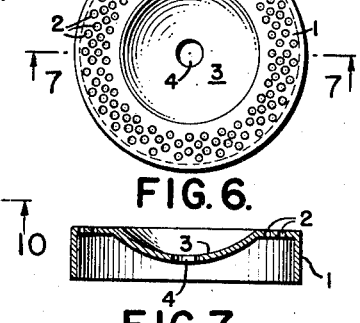
Figs. 6 and 7 are a plane view and a sectional view across the line VII—VII of Fig. 6 respectively showing the grid-forming stamped cap member.
Figure 11:
Fig. 11 shows in axial section a mushroom-shaped member that may be fitted on the grid for ornamental purpose.
Figure 9:
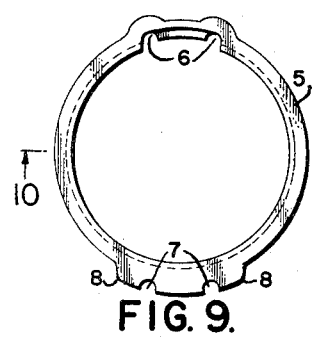
Figs. 9 and 10 are a plane view and a sectional view through the line X—X of Fig. 9 respectively of the hoop-ring to be fitted on the cap member of Figs. 6 and 7.
Figure 7:
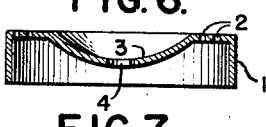
Figure 10:
Figure 12:
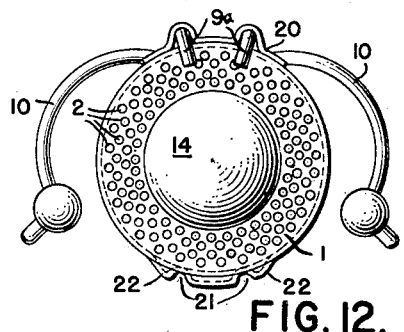
Figs. 12 and 13 are plane views of a locking device comprising a pair of symmetrical hooks, and of the same locking device with a single hook extending along more than one-half of the capsule periphery.

As both hooks 10 can be pivoted away from the ring member 5 as shown in Figs. 5 and 12 the grid consisting of cap member 1 and ring member 5 can freely cap the top edge of the neck of the bottle or container r (Fig. 1) which is provided in the known fashion with helical milling faces h. Under these conditions, the user will grip both ball-shaped tips 13 with his or her fingers and move them towards each other. During this movement the rectilinear portions 11 of the hooks will be forced along the cam faces 8 of the ring member 5 so as to resiliently alter the shape of the curved portions of the hooks which will resume their original shape only after the ball-shaped tips 13 engage the outer cavities 7 and remain locked therein by the inherent resiliency of the hooks.

Thus, the semi-circular hooks 10 will be positioned beneath the bead b (Fig. 2) and the grid will be securely held in position. The reverse operation may be carried out, for instance in order to fill up the container, and in this case it will be noted that the aperture of the container can be uncovered completely.

In the embodiment illustrated in Fig. 12 the grid member 2 is not fitted with a plastic hoop-ring and the hook-carrying cavities 6 are formed by providing an additional pressed plate 20 fixed through any suitable means and method to the grid. Besides, the capsule edge opposite to the plate 20 is so shaped as to provide a pair of locking cavities 21 and a pair of cam faces 22 adjacent thereto.

Figure 13:
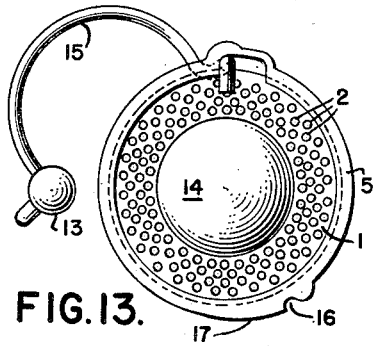

The capsule illustrated in Fig. 13 comprises only one hooks 15 extending along more than one-half of the circumference whereas the ring member 5 is formed with an off-centered cavity 16 similar to the cavities 11 or 21 of the other embodiments and also preceded by a cam face 17.

Figure 14:
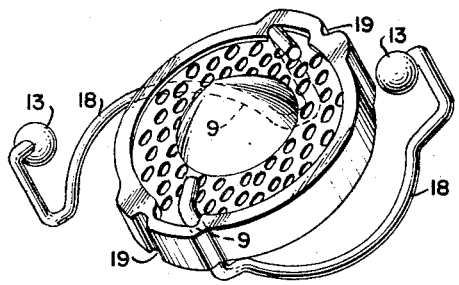
Fig. 14 is a pesrpective view of a locking device comprising a pair of identical hooks pivotally mounted at two diametrally opposite points.

In the embodiment shown in Fig. 14 both hooks 18 are identical and not symmetrical as in the embodiment of Fig. 12. Their pivot ends 9 are journaled at diametrally opposite points; besides, the outer locking cavities 19 are also positioned at diametrally opposite points.

Figure 16:
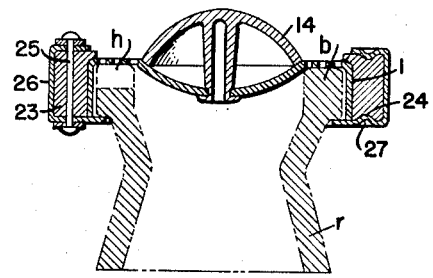
Fig. 16 is an axial section of the device of Fig. 15.
Figure 15:
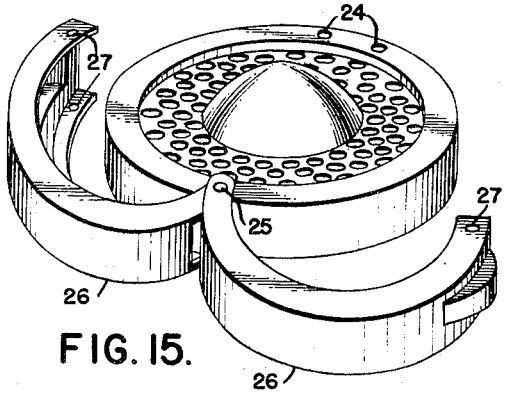
Fig. 15 is a perspective view of a modified embodiment of the capsule according to the invention comprising a plastic hoop-ring and metal half-collars.

In the embodiments shown in Figs. 15 and 16 the capsule 1 is fitted with a hoop-ring 23 preferably of plastic material and emerging above the top surface of the capsule. The upper and lower faces of the hoop-ring 23 are formed with small cavities 24 disposed by pairs and diametrally opposite thereto is a hinge pin 25 parallel to the capsule axis and carrying a pair of cooperating half-collars 26 having a U-shaped cross-section and formed at their free ends with inner pressed catches 27 so that in the closed condition of the half-collars these catches will resiliently engage the cavities 24 and lock the capsule assembly in position.

The lower wings of the half-collars 26 are wider than the upper wings so that in the locked position they will engage the lower face of the bead b of the container r as shown in Fig. 16.

Figure 17:
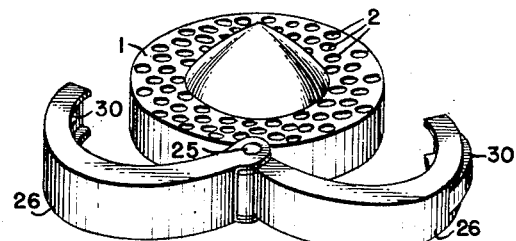
Fig. 17 is a modified embodiment of the capsule of Fig. 15 but without the plastic hoop-ring.
Figure 18:
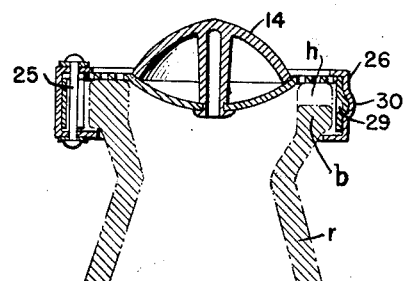
Fig. 18 is an axial section of the device of Fig. 17.
Figure 19:
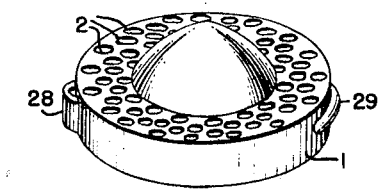
Fig. 19 is a perspective view of the grid-forming capsule.

In the embodiment illustrated in Figs. 17–19 the capsule 1 (Fig. 19) carries no hoop-ring and is formed with a semi-cylindrical projection 28 parallel with the capsule axis and adapted to receive the hinge pin 25 of a pair of half-collars 26 as shown. This capsule is also formed with a pair of symmetrical pressed projections 29 (of which only one is visible in Fig. 19) and each half-collar is formed with a registering pressed cavity or notch 30 adapted to engage the aforesaid projections 29 when the device is locked.

I wish it to be understood that I do not desire to be limited to the exact details of construction shown and described, for obvious modifications will occur to a person skilled in the art.

What I claim as new is:

1. A detachable capsule for a container formed around its aperture with an annular bead, comprising a cap member adapted to cover said aperture and having a height approximately equal to that of said annular bead, a hoop-ring surrounding said cap member and formed with peripheral inner and outer cavities parallel with the axis of said capsule, and fastening members pivotally mounted in said inner cavities and adapted resiliently to engage said outer cavities and the lower edge of said annular bead in their capsule-retaining positions.

2. A detachable capsule for a container formed around its aperture with an annular bead, comprising a perforated cap member adapted to cover said aperture and having a height approximately equal to that of said annular bead, a hoop-ring surrounding said cap member and formed with a pair of inner peripheral cavities and a pair of outer peripheral cavities parallel with the axis of said capsule, and a pair of symmetrical fastening members, each of said fastening members being pivotally mounted with one end portion in one of said inner peripheral cavities, formed with a central curved portion engageable beneath said annular bead, its opposite end portion being resiliently engageable in one of said outer peripheral cavities in the capsule-retaining positions of said fastening members.

3. A detachable milling capsule for a spice-mill formed on the top edge of its neck with upstanding annularly spaced grinding teeth and an outer annular bead, comprising a metal cap member adapted to cover said aperture, having a height approximately equal to that of said annular bead, a central concave portion and a perforated annular portion adapted to register with said teeth, a plastic cylindrical hoop-ring surrounding said cap member, said hoop-ring being formed with a narrow top flange adapted to cover the outer edge of said cap member, a pair of inner peripheral cavities and a pair of outer peripheral cavities parallel with, and diametrically opposite to said inner peripheral cavities, cam faces formed on either side of said pair of outer peripheral cavities, and a pair of symmetrical fastening members consisting each of a resilient metal wire formed with a rectilinear end portion parallel with, and adapted to be pivotally mounted in, one of said inner peripheral cavities, a central curved portion engageable beneath said annular bead, another rectilinear end portion parallel with, and resiliently engageable in, one of said outer peripheral cavities in the capsule-retaining position of said fastening members, and a ball-shaped element on the tip of said other end.

4. A detachable capsule for a container formed around its aperture with an annular bead comprising a perforated cap member adapted to cover said aperture and having a height approximately equal to that of said annular bead, a hoop-ring fitted round said cap member and formed with an inner and an outer peripheral cavity, said cavities being parallel with the axis of said capsule, a fastening member having one end pivotally mounted in said inner peripheral cavity and a central curved portion longer than one half of the circumference of said bead engageable beneath said annular bead, and another end portion resiliently engageable in said outer peripheral cavity in the capsule retaining position of said fastening member.

5. Apparatus for grinding and distributing particles of food and the like, comprising, in combination, a container having an open end surrounded by an end face in the form of grinding teeth and having an outer annular shoulder extending about said open end thereof and being located adjacent to said teeth, said annular shoulder having an annular face directed away from said teeth; cap means turnably mounted on said open end of said container and having an annular perforated portion located opposite and closely adjacent to said grinding teeth; and releasable lock means mounted on said cap means for movement to and from a locking position where a part of said lock means is located opposite said annular face of said shoulder to prevent removal of said cap means from said container while maintaining said cap means freely turnable on said container.

6. Apparatus for grinding and distributing particles of food and the like, comprising, in combination, a container having an open end surrounded by an end face in the form of grinding teeth and having an outer annular shoulder extending about said open end thereof and being located adjacent to said teeth, said annular shoulder having an annular face directed away from said teeth; cap means turnably mounted on said open end of said container and having an annular perforated portion located opposite and closely adjacent to said grinding teeth; and releasable lock means mounted on said cap means for movement to and from a locking position where a part of said lock means is located opposite said annular face of said shoulder to prevent removal of said cap means from said container while maintaining said cap means freely turnable on said container, said lock means being in the form of an elongated member pivotally mounted on said cap means and having a first locking portion located in releasable locking engagement with a second locking portion forming part of said cap means.

7. Apparatus for grinding and distributing particles of food and the like, comprising, in combination, a container having an open end surrounded by an end face in the form of grinding teeth and having an outer annular shoulder extending about said open end thereof and being located adjacent to said teeth, said annular shoulder having an annular face directed away from said teeth; cap means turnably mounted on said open end of said container and having an annular perforated portion located opposite and closely adjacent to said grinding teeth; and releasable lock means mounted on said cap means for movement to and from a locking position where a part of said lock means is located opposite said annular face of said shoulder to prevent removal of said cap means from said container while maintaining said cap means freely turnable on said container, said lock means being in the form of an elongated member pivotally mounted on said cap means and having a first locking portion located in releasable locking engagement with a second locking portion forming part of said cap means, one of said locking portions being formed with a depression in which the other of said locking portions is located.

8. Apparatus for grinding and distributing particles of food and the like, comprising, in combination, a container having an open end surrounded by an end face in the form of grinding teeth and having an outer annular shoulder extending about said open end thereof and being located adjacent to said teeth, said annular shoulder having an annular face directed away from said teeth; cap means turnably mounted on said open end of said container and having an annular perforated portion located opposite and closely adjacent to said grinding teeth; and releasable lock means mounted on said cap means for movement to and from a locking position where a part of said lock means is located opposite said annular face of said shoulder to prevent removal of said cap means from said container while maintaining said cap means freely turnable on said container, said lock means being in the form of an elongated member pivotally mounted on said cap means and having a first locking portion located in releasable locking engagement with a second locking portion forming part of said cap means, one of said locking portions being formed with a depression in which the other of said locking portions is located, and said other locking portion being formed of a springy material so as to snap into and out of said depression.

9. A food distributing device comprising, in combination, a container having an open end formed with an outer annular bead; a perforated cap means turnably mounted on said open end of said container and having a side wall located closely about said bead; and releasable lock means pivotally mounted on a predetermined portion of said side wall of said cap means for movement to and from a locking position where said locking means has a first portion thereof located in sliding engagement with an underface of said bead distant from said open end of said container and a second portion located in locking engagement with a locking portion of said cap member located substantially diametrically opposite said predetermined portion of said side wall of said cap means.

10. A food distributing device as defined in claim 9 and wherein one of said portions which are in locking engagement with each other is formed with a depression in which the other of said portions is located, said second portion of said locking means being made of a springy material so as to snap into and out of locking engagement with said locking portion of said cap means.

References Cited in the file of this patent

UNITED STATES PATENTS

| Number | Name | Date |
|---|---|---|
| Re. 4,615 | Tripp | Oct. 31, 1871 |
| Re. 12,065 | Doolittle | Dec. 23, 1902 |
| 208,193 | Michel | Sept. 17, 1878 |
| 350,598 | Morgan et al. | Oct. 12, 1886 |
| 616,890 | Burkhart | Jan. 3, 1899 |
| 640,182 | Doolittle | Jan. 2, 1900 |
| 651,500 | Doolittle | June 12, 1900 |
| 689,543 | Doolittle | Dec. 24, 1901 |
| 981,239 | Baron et al. | Jan. 10, 1911 |
| 1,259,168 | Torrazza | Mar. 12, 1918 |